Aug. 4, 1953  B. WASKO  2,647,741
ANALYTICAL BALANCE
Filed July 26, 1950  3 Sheets-Sheet 1
FIG.I.
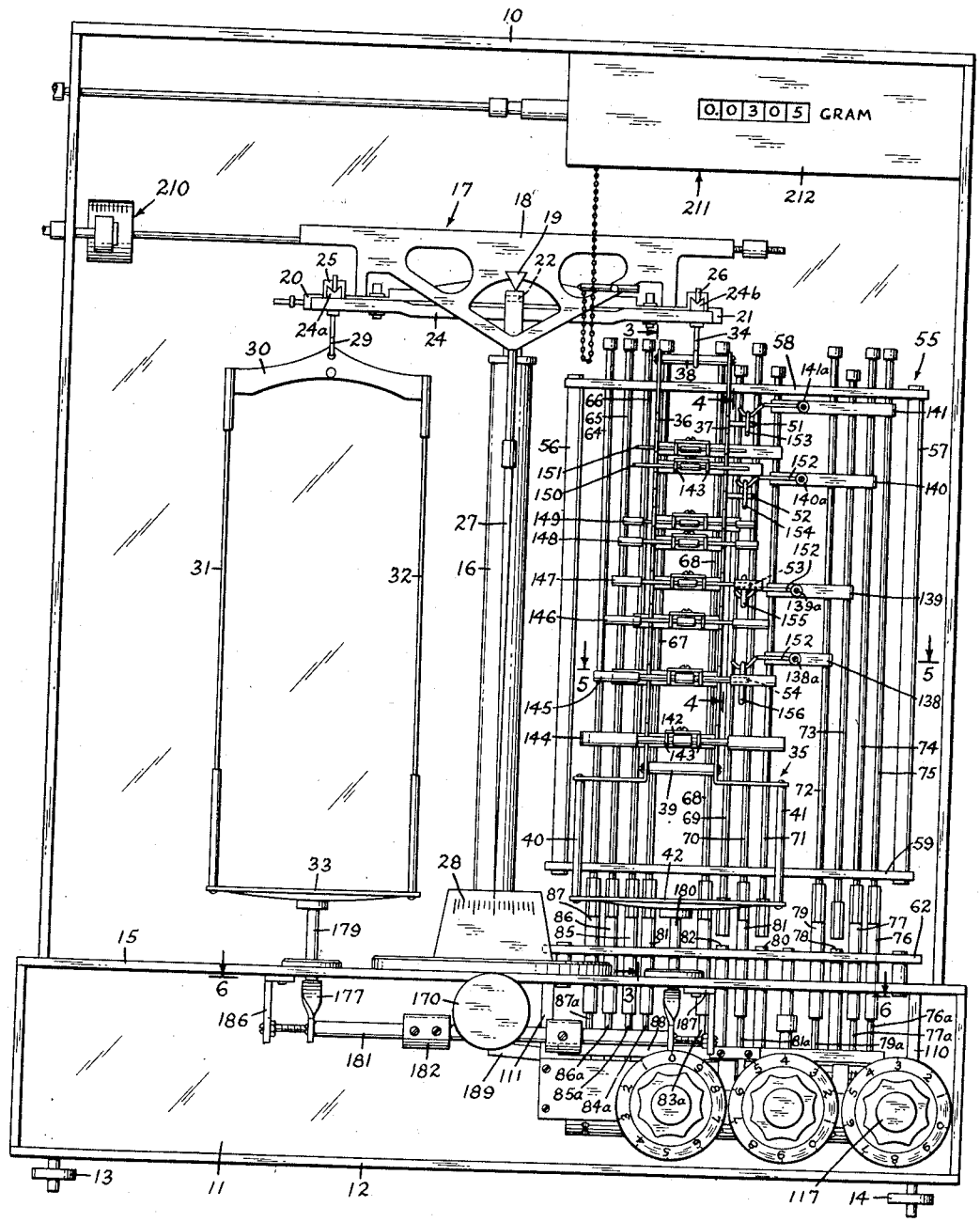
INVENTOR.
BERNARD WASKO
BY
Campbell, Brumbaugh, Free & Graves
HIS ATTORNEYS.

Aug. 4, 1953
B. WASKO
2,647,741
ANALYTICAL BALANCE
Filed July 26, 1950
3 Sheets-Sheet 2
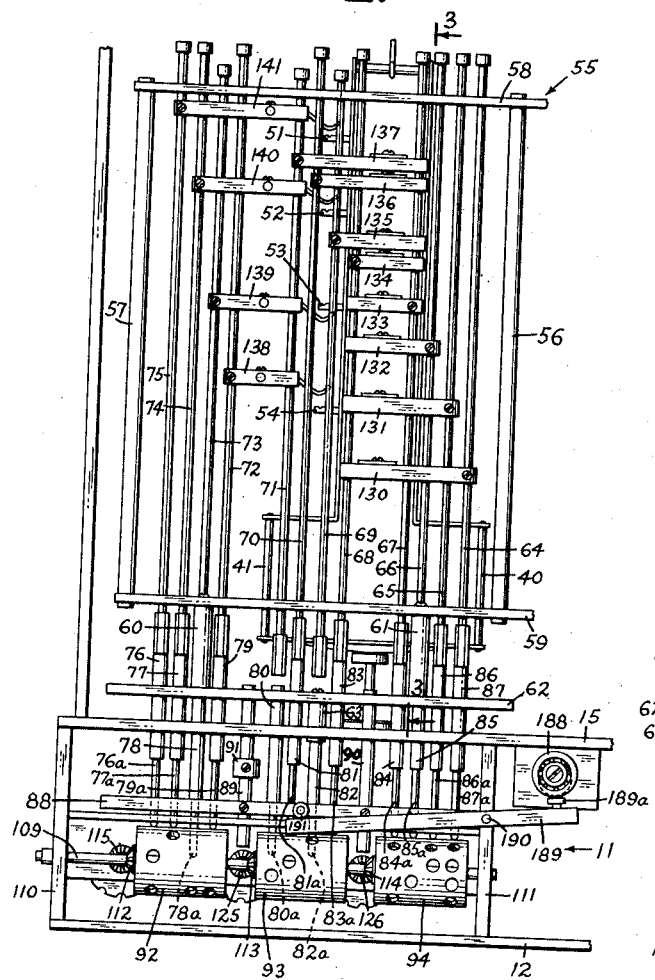
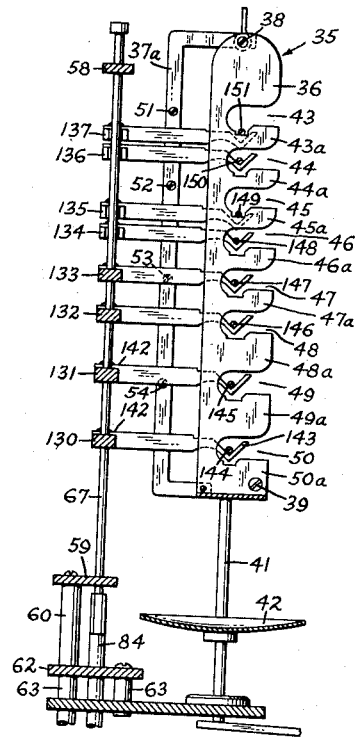
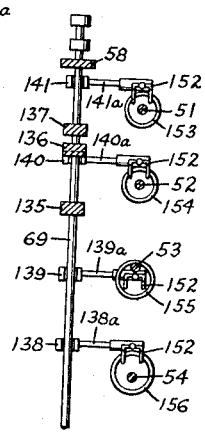
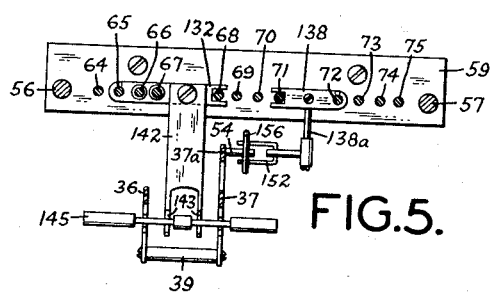
INVENTOR.
BERNARD WASKO
BY
Campbell, Brumbaugh, Free & Graves
HIS ATTORNEYS.

Aug. 4, 1953  B. WASKO  2,647,741
ANALYTICAL BALANCE
Filed July 26, 1950  3 Sheets-Sheet 3
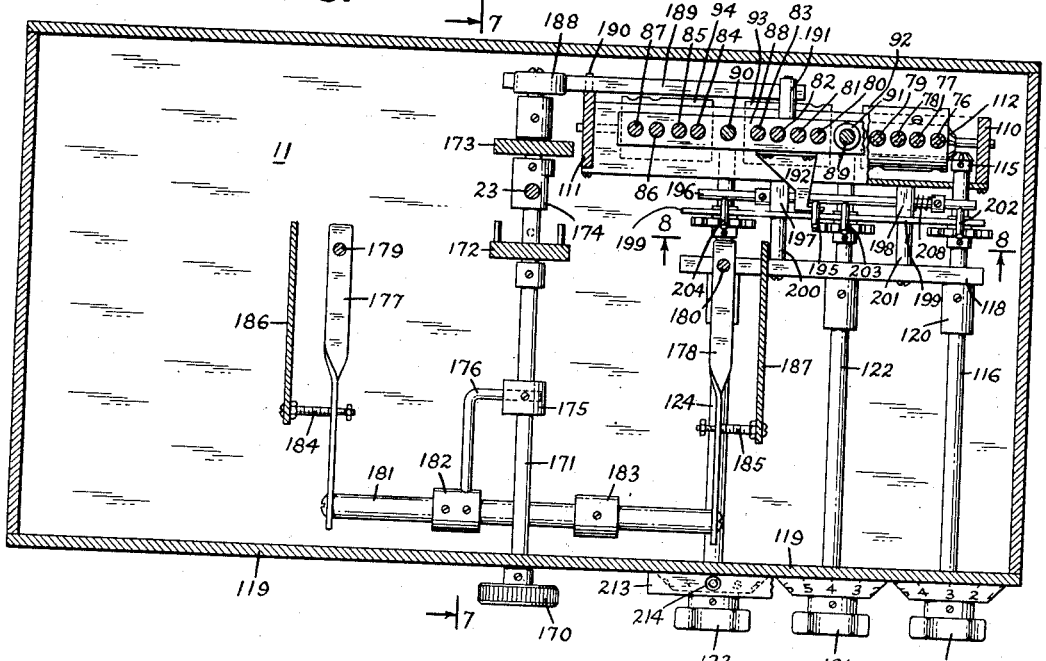
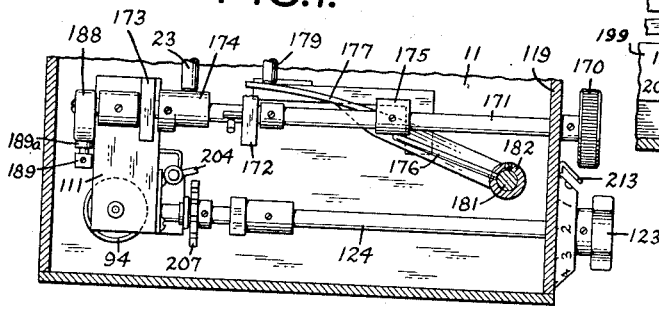
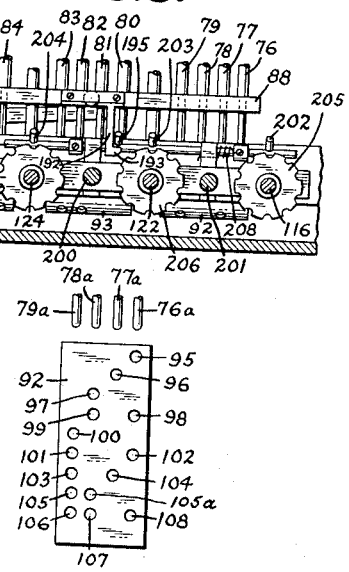
INVENTOR.
BERNARD WASKO
BY
Campbell, Brumbaugh, Free & Graves
HIS ATTORNEYS.

Patented Aug. 4, 1953

2,647,741

UNITED STATES PATENT OFFICE 2,647,741

ANALYTICAL BALANCE

Bernard Wasko, Bronx, N. Y., assignor to Voland and Sons, Inc., New Rochelle, N. Y., a corporation of New York Application July 26, 1950, Serial No. 175,934

12 Claims. (Cl. 265—54)

This invention relates to improvements in analytical balances for the precision weighing of materials and it relates particularly to a semiautomatic balance by means of which weighing operations can be accomplished without handling the weights and the weight of the material is automatically and visually indicated as the result of the weighing operation.

In accordance with the invention, a precision balance is provided in which any weight, or a combination of weights, can be placed on one arm of the balance beam by means of suitably arranged knobs accessible at the exterior of the balance case. The knobs are associated with an indicator which affords a visual indication of the value of the weight or weights placed upon the arm of the balance beam.

The balance may be of the chain type in which fractions of grams or other units of weight can be applied to the weight-receiving arm of the balance by variation in the length of the chain suspended from the arm. For convenience, the chain weighing mechanism can be associated with a direct reading indicator or register whereby fractions of grams or other units of weight also are indicated visually. Such a chain weighing and indicating mechanism is disclosed in my copending application Serial No. 734,155, filed March 12, 1947, now abandoned.

More particularly, each control knob has an associated control drum movable by means of said knob into various positions permitting selective movement of one or more weight-supporting members or hooks to place the weights thereon on the receivers of one of the balance pan hangers when the balance arm release knob is moved to effect a weighing operation.

The weight-supporting hooks are mounted on vertically extending and vertically movable rods, the movement of which is controlled by means of the associated control drums and apertures therein. The apertures or holes in the drums are arranged in a predetermined pattern so that selected weight-supporting members can be lowered in accordance with the adjusted position of each knob. Inasmuch as an indicating means is associated with the knobs, the value of the weights in use can be indicated directly at the front of the balance case.

The above-described mechanism permits the balance case to be closed during a weighing operation so that air currents will not affect the accuracy of the balance. Moreover, the closed casing helps to keep the temperature and the humidity around the balance more constant and minimizes errors arising from changes in temperature and humidity. Also, inasmuch as the weights are not touched, except for cleaning purposes, there is less possibility of changing their value by corrosion or the accumulation of oil, moisture or dust thereon.

In addition, inasmuch as it is unnecessary to select and place, manually, various combinations of weights on the balance pan, or to open and close the balance case each time the weights are changed, the time required to weigh a material is greatly reduced.

For a better understanding of the present invention, reference may be had to the accompanying drawings, in which:

Fig. 1 is a view in front elevation of a typical balance embodying the present invention, with the front of the casing removed and the front panel of the bottom compartment of the balance also removed to disclose details of construction;

Fig. 2 is a view in side elevation looking toward the back of the weight-supporting and applying mechanism of the balance;

Fig. 3 is a view in vertical section taken on line 3—3 of Fig. 2;

Fig. 4 is a view in vertical section of a portion of the weight-applying mechanism taken on line 4—4 of Fig. 1;

Fig. 5 is a view in horizontal section taken on line 5—5 of Fig. 1;

Fig. 6 is a view in horizontal section taken on line 6—6 of Fig. 1;

Fig. 7 is a view in vertical section taken on line 7—7 of Fig. 6;

Fig. 8 is a view in vertical section taken on line 8—8 of Fig. 6; and

Fig. 9 is a schematic development of one of the control drums of the weight-applying mechanism.

Referring now to Fig. 1 of the drawing, the balance chosen for purposes of illustration may include a balance case 10 of any desired construction but preferably having transparent glass front and back panels which may be raised and lowered or removed as desired. The case has a lower compartment 11 in which the actuating mechanism for the balance, later to be described, is housed. The bottom compartment 11 has a bottom closure or floor 12 carrying screw threaded legs 13 and 14 at its corners permitting the case to be levelled. Compartment 11 has a top 15 forming the platform on which the standard 16 for supporting the balance beam 17 is mounted.

The balance beam may be of any suitable construction, and, as illustrated, includes a rigid beam member 18 which carries a center fulcrum or pivot member 19 and knife-edge balance pan fulcrums, not shown, at opposite ends of the outwardly extending hanger supporting arms 20 and 21. The fulcrum 19 cooperates with a fulcrum support 22 which is fixed relative to the standard 16. The standard 16 also carries an arresting member or frame 24 which is mounted on the shaft 23, movable axially of the standard. The frame 24 is provided at opposite ends with notched blocks 24a and 24b for engaging the ends of the balance pan hangers 25 and 26 to disengage them from the fulcrum or knife members on the arms 20 and 21 when the frame 24 is raised to disengage the fulcrum 19 from the support 22. The above-described balance beam and mounts therefor are conventional and any other type of mechanism for this purpose may be used, if desired.

The balance beam 18 also carries the usual pointer 27 for cooperation with the scale 28 to indicate whether the balance is in equilibrium.

The hanger 25 carries a hook 29 at its lower end for engaging the scale pan bracket 30 which carries at the lower ends of the rods 31 and 32 thereon a scale pan 33 for receiving the material to be weighed. This structure is likewise conventional and may be modified as desired.

The opposite hanger 26 is also provided with a hook member 34 for supporting a novel scale pan and weight-receiving member 35. As best shown in Figs. 1 and 3, the scale pan 35 includes a pair of side plate members 36 and 37 which are substantially identical in shape and are connected at their upper end by means of a cross rod 38 to maintain them in a fixed relation. Their lower ends are also connected by means of a cross rod 39 and the plates 36 and 37 are bent outwardly at right angles in opposite directions below the cross bar 39 to form flanges for supporting the upright bars or rods 40 and 41 which are connected to the edges of the weight-receiving pan 42. Each of the side plates 36 and 37, for example, the side plate 36, as viewed in Fig. 3, is provided with a series of eight notches 43, 44, 45, 46, 47, 48, 49 and 50 which extend inwardly over half the width of the plate and divide the side plates 36 and 37 into a plurality of weight-receiving hooks 43a to 50a.

The side plate 37 differs from the side plate 36, described above, in that it is provided with a C-shaped bracket 37a having four laterally directed notched pins 51, 52, 53 and 54 thereon which form weight-receiving hooks.

The side plates 36 and 37 receive weights from a weight applying system now to be described.

The weight applying system includes, as best shown in Figs. 1 and 2, a frame member 55 consisting of a pair of vertically extending parallel rods 56 and 57 which are joined by a pair of cross plates 58 and 59. The cross plate 59 is supported by means of a pair of rods 60 and 61 from a cross plate 62 spaced from the platform 15 of the balance by means of a plurality of spacer members 63. The several plates 58, 59 and 62 are rigidly supported on the platform 15 and parallel therewith. Each of the cross plates 58, 59 and 62 is, in the embodiment of the invention illustrated, provided with a series of twelve aligned holes for guiding slidably the headed rods 64, 65, 66, 67, 68, 69, 70, 71, 72, 73, 74 and 75 and associated operating elements for moving these rods vertically.

The associated operating elements may consist of a series of plungers 76, 77, 78, 79, 80, 81, 82, 83, 84, 85, 86 and 87, each of which is in alignment with, but not connected to, the lower end of a corresponding rod 64 to 75 and is guided in the plate 62 and apertures in the platform 15. Each of the plungers has a reduced lower end portion 76a to 87a which is slidably received in a cross bar 88 mounted for vertical reciprocation within the compartment 11. The cross bar 88 is fixedly mounted on the guide rods 89 and 90 which are mounted for vertical sliding movement in apertures in the platform 15 and the cross plate 62. The guide rod 89 is provided with a sleeve 91 for limiting upward movement of the rod 89 and the plate 88. The shoulders at the upper ends of the reduced portions 76a to 87a of the plungers 76 to 87 are adapted to engage the plate 88, whereby their upward and downward movement are controlled, in part, by upward and downward movement of the plate 88.

Each group of four plungers 76 to 79, 80 to 83 and 84 to 87 cooperates with a separate, hollow control drum 92, 93 and 94, respectively. These drums are used to control the downward movement of the several plungers 76 to 87 and the aligned rods 64 to 75, in the following manner.

Referring now to Fig. 9, which discloses a typical development of one of the drums 92, 93 and 94, all of which are alike, it will be seen that these drums are provided with nine groups of apertures arranged in rows transversely of the drum. At the top only a single aperture 95 is provided for cooperation with, in the case of drum 92, the reduced end 76a of the plunger 76. In the second row, the aperture 96 cooperates with and is adapted to receive the reduced end 77a on the plunger 77. The aperture 97 in the third position cooperates with the reduced end 78a of the plunger 78. In the fourth row, apertures 98 and 99 are adapted to receive the ends 76a and 78a of the plungers 76 and 78. In the fifth row, the aperture 100 is adapted to receive the reduced end 79a of the plunger 79. In the sixth row, the apertures 101 and 102 receive reduced ends 76a and 79a of the plungers 76 and 79. In the seventh position, the apertures 103 and 104 receive the plunger ends 77a and 79a. In the eighth position, the apertures 105 and 105a receive the plunger ends 78a and 79a. In the ninth position, the apertures 106, 107 and 108 receive the plunger ends 76a, 78a and 79a. In the tenth or zero position, the drum is imperforate to prevent any of the plungers from dropping. In this way, by rotating the drum 92, it is possible to lower one, or a combination of, the plungers 76a to 79a and the corresponding rods of the group of rods 72 to 75 which are in alignment with an aperture or apertures in the adjusted position of the drum. Those plungers not in alignment with an aperture or apertures in the top of the drum 92 can be lowered only into contact with the surface of the drum.

The drums 93 and 94 are similarly constructed for cooperation with their respective groups of four rods each as indicated above. All of the drums 92 to 94 are rotatably mounted on a shaft 109 which extends between the vertical plates 110 and 111 extending downwardly from the platform 15 of the compartment 11.

The plates 110 and 111 can be fixed to the platform 15 or to a separate mounting plate. The drums 92, 93 and 94 are provided, respectively, with bevel gears 112, 113 and 114 which are fixed to the drums and rotatable relative to the shaft 109.

As shown in Figs. 2 and 6, the bevel gear 112 on the drum 92 meshes with a bevel gear 115. This gear is fixed to a shaft 116 (Fig. 6) which carries at its outer end an adjusting knob 117 for rotating the shaft 116 and the drum 92. The shaft 116 is rotatably mounted in the front panel 119 of the compartment 11 and in a plate 118 fixed to the plates 110 and 111. If desired, and as shown in Fig. 6, the shaft 116 may be a two part element having a coupling 120 between its inner and outer ends to permit the knob 117 and a portion of the shaft 116 to be removed for packing or shipping the balance.

The drum 93 is rotated in a similar way by means of a knob 121 mounted on a shaft 122 and the drum 94 is rotated by means of a knob 123 mounted on the shaft 124. The shafts 122 and 124 carry at their inner ends the bevel gears 125 and 126, respectively, meshing with the bevel gears 113 and 114, respectively, as shown in Fig. 2.

In this way, the angular position of the drums 92, 93 and 94 can be adjusted by rotation of the knobs 117, 121 and 123, respectively, to dispose the aperture or apertures directly below the respective pusher members 76 to 87.

The drum and rod construction described above is used to deposit weights on the hooks 43a to 50a of the side plates 36 and 37 or on the hook pins 51 to 54 to balance the material or article being weighed in the scale pan 33. As shown in Figs. 1, 2 and 3, each of the rods 64 to 75 has a cross bar secured to it. The rod 64 carries a cross bar 130; the rod 65, a cross bar 131; the rod 66, a cross bar 132; the rod 67, a cross bar 133; the rod 68, a cross bar 134; the rod 69, a cross bar 135; the rod 70, a cross bar 136; the rod 71, a cross bar 137; the rod 72, a cross bar 138; the rod 73, a cross bar 139; the rod 74, a cross bar 140; and the rod 75, a cross bar 141. The cross bars may be fixed to their respective rods by means of set screws and may be suitably perforated to slidably receive the rods adjacent thereto in order to guide and prevent tilting of the cross bars.

The cross bars 130 to 137 extend inwardly into the space between the group of rods 64 to 67 and the group of rods 68 to 71. The cross bars 138 to 141 extend into and across the space between the group of rods 68 and 71 and the group 72 to 75. The cross bars are suitably spaced vertically to prevent interference between them, as shown in Figs. 1, 2 and 3.

As best shown in Figs. 2 and 3, each of the cross bars 130 to 133 is provided with a forwardly extending plate member 142 which has downwardly bent side flanges terminating in spaced apart hook-shaped portions 143. These hook-shaped portions 143 are arranged to receive grooved rod-like weights 144, 145, 146 and 147 in a position such that when the rods 64 to 67 are in their highest position, each weight will be disposed about in the middle of one of the notches 47 to 50 in the side plates 36 and 37. The side plates 36 and 37 are disposed on opposite sides of the hook members 143. Similarly the cross members 134 to 137 are provided with plates terminating in hook members 143 for supporting the weights 148, 149, 150 and 151. These hook members are also so located as to dispose the weights about in the middle of the notches 43 to 46 in the side plates 36 and 37 when the rods 68 to 71 are in their highest positions.

The cross bars 138 to 141 are provided with outwardly projecting lugs 138a to 141a, each of which carries a hook member 152 that straddles one of the weight-receiving pins 51, 52, 53 and 54. The hook members 152 are adapted to receive ring-like weights 153, 154, 155 and 156 so that the rings are about concentric with their respective pins 51 to 54 (Fig. 4) respectively when the rods 72 to 75 are in their highest positions.

For purposes of illustration, the weights carried by the various hook members have the following values:

Weight member:

| | | |
|---|---|---|
| 144 | grams | 50 |
| 145 | do | 30 |
| 146 | do | 20 |
| 147 | do | 10 |
| 148 | do | 5 |
| 149 | do | 3 |
| 150 | do | 2 |
| 151 | do | 1 |
| 153 | milligrams | 100 |
| 154 | do | 200 |
| 155 | do | 300 |
| 156 | do | 500 |

With this relation of weights, it will be apparent, upon reference to Fig. 9, that when the plunger 79 and its corresponding rod 72 are lowered because the reduced plunger portion 79a enters the aperture 100 in the drum (Fig. 9), the weight 156 will be deposited on the pin hook 51 and 500 milligrams will be added to the scale pan hanger 35. If the weight 155 is placed on the hook pin 54 because the aperture 97 is brought into alignment with the plunger pin 78a, 300 milligrams will be added. If the plunger pin 77a is lowered through the aperture 96 by adjustment of the drum, the weight 154 will be placed on the hook pin 52 and 200 milligrams will be added to the scale pan hanger. With the drum 92 in the first position, the 100 milligram weight 153 will be placed on the hook pin 51. In the fourth position, the 100 milligram and the 300 milligram weights 153 and 155 will be lowered onto the pins 51 and 53 and 400 milligrams will be added to the pan. Similarly, 500, 600, 700, 800 and 900 milligrams can be added by appropriately positioning the drum 92 with respect to the plungers 76a to 79a. In a like manner, the drum 93 may be utilized to lower 1 to 9 grams of weights represented by the weight members 148 to 151 onto the hooks 43a to 46a of the plates 36 to 37. From 10 to 90 grams of added weight can be placed on the hooks 47a to 50a of the scale pan 35 by using similar combinations of the apertures in the drum 94.

As shown in Figs. 1 and 6, each of the knobs 117, 121 and 123 has indicia around its edges from 0 to 9. In a zero position of the knob, none of the apertures in the corresponding drum is disposed below the plunger members. The other numerical values correspond to the weights to be applied. Thus, the numeral 1 on drum 123 corresponds to 10 grams, the numeral 1 on drum 121 corresponds to 1 gram and the numeral 1 on the drum 117 corresponds to 100 milligrams. By adjusting the various knobs so each of the numerals 9 is at the top, 99.9 grams can be deposited on the scale pan 35 as described above.

Inasmuch as it would be undesirable to deposit the weights while the balance beam is supported by its fulcrum 19, the device is arranged to place the weights on the scale pan supports, place the balance beam on its fulcrum and release the scale pans for a weighing operation, in a predetermined sequence. Also, during the weighing operation, it is desirable to lock the drums against rotation to prevent damage to the plunger pins which may be engaged in apertures of the drums 92 to 94 and also to prevent the placing of weights on the pan when the balance is not arrested. This mechanism is controlled by the balance release knob 170 (Figs. 1, 6 and 7). The balance release knob is mounted on a shaft 171 (Figs. 6 and 7) which extends through the front panel 119 of the compartment 11 and is also journalled in a pair of plates 172 and 173 mounted in the compartment 11. The shaft 171 carries a cam member 174 which engages the lower end of the shaft 23 on which the fulcrum support 22 is mounted. The shaft 171 also carries an eccentric cam 175 which cooperates with an L-shaped lever 176 for actuating the fingers 177 and 178 which raise and lower the balance pan support and release buttons 179 and 180, respectively, as shown in Figs. 1, 6 and 7. The fingers 177, 178 are screwed to the end of a shaft 181 on which the L-shaped member is secured by means of a sleeve 182. The sleeve 182 and another sleeve 183 act as counterbalances normally tending to lift the pan support and release buttons 179 and 180 upwardly against the bottoms of the scale pans 33 and 42. The fingers 177, 178 are pivotally mounted on screws 184 and 185 which are adjustably mounted in the brackets 186 and 187 secured to the underside of the platform 15 so that the fingers tilt freely.

The rear end of the shaft 171 carries a ball-bearing mounted eccentric 188 (Figs. 2, 6 and 7) which engages a lever 189 having an adjusting screw 189a supported for pivotal movement on a pivot pin 190 carried by the end plate 111 in which the drum supporting shaft 109 is mounted. The left-hand end of the lever 189, as viewed in Fig. 2, engages beneath a roller 191 which extends rearwardly from the cross bar 88 so that when the lever 189 is rocked clockwise by the eccentric 188, the plate 88 is lifted up and engages the shoulders on the plungers 76 to 87 lifting all of them simultaneously to their highest positions where their lower ends are disposed above the drums 93 and 94. When the lever 189 is rocked counterclockwise to the position shown in Fig. 2, all of the plungers 76 to 87 are lowered together with the aligned weight-supporting rods 64 to 75. Those plungers in alignment with holes in the upper surfaces of the drums 92, 93 and 94 are lowered farther to place the corresponding weights on the scale pan plates 36 and 37 and/or the hooks 51 to 54. For example, the plungers 78a, 80a and 82a, as shown in Figs. 1 and 2, are lowered to place the weight 155 on the hook 53 and the weights 149 and 151 are placed on the side plates 36 and 37 of the scale pan.

Still another element, namely, a lock for the drums 92 to 94, is controlled indirectly by the knob 170. The cross bar 88, as shown in Figs. 6 and 8, carries a forwardly and downwardly extending plate member 192 having a hook 193 on its lower end. The hook 193 is located below a pin 195 which extends outwardly from a shaft 196 rotatably mounted in bearings 197 and 198 carried by a plate 199 fixed to the end plates 110 and 111. The cross plate or partition 118 is supported by the cross plate 199 by means of spacer members 200 and 201 (Figs. 6 and 8). The shaft 196 also carries three other forwardly extending pins 202, 203 and 204 which cooperate with and lock the shafts 116, 122 and 124 against rotation by engagement in notches in the edges of the notched discs 205, 206 and 207 fixed, respectively, to the shafts 116, 122 and 124. The pins 202, 203 and 204 are normally urged toward the notched discs by means of a coil spring 208 connected to the shaft 196 and the bearing 198. Thus, when the cross bar 88 is lowered, the shaft 196 rocks to engage the pins 202, 203 and 204 in an aligned notch in a corresponding disc 205 to 207, thereby preventing rotation of the shafts 116, 122 and 124 by their respective knobs. However, when the cross plate 88 is lifted to raise the plunger members out of the holes in the drums, the lock pins 202 to 204 are lifted out of engagement with the notched discs to permit further adjustment of the balance.

The arrangement of the cams 174, 175 and the eccentric 188 is such that upon counterclockwise rotation of the knob from the non-weighing position, the cross bar 88 moves downwardly to deposit the weights on the scale pan hanger 35, and, simultaneously, the pins 202, 203 and 204 engage the notched discs 205, 206 and 207 to prevent further rotation of the knobs. Immediately thereafter, the shaft 23 is lowered by the cam 174 to engage the fulcrum 19 with the fulcrum plate 22 and engage the scale pan hangers 25 and 26 with their corresponding knife edges on the arms 20 and 21 of the balance beam. Immediately after this condition is attained, the cam 175 rocks the fingers 177, 178 downwardly, thereby freeing the scale pans and allowing them to swing to provide an indication of the state of equilibrium between the weights and the material on the scale pan 33.

In order to dampen the swing of the balance beam, the balance described above may be provided with a magnetic vibration dampener 210 of the type disclosed in Patent No. 2,448,477, dated August 31, 1948.

Also, for critical weighing, the balance beam may be provided with a chain weighing mechanism 211 including a direct reading indicator or register 212 of the type disclosed in my co-pending application Serial No. 734,155 which also enables adjustment of the equilibrium of the balance and reading in fractions of grams to the fourth decimal place up to 0.1000 gr.

Through the medium of the numbers or indicia on the actuating knobs 117, 121 and 123, and the reading on the indicator 212, it is possible to weigh and read directly values up to 100 grams without the addition of weights to the weight pan 42. It will be understood, of course, that additional weights can be placed on the pan 42 when greater amounts of material are to be weighed.

To facilitate reading of the indicia on the knobs, the front of the balance case may be provided with a screening plate 213 (Figs. 6 and 7) having openings 214 through which only the top indicium on each knob is visible.

From the preceding description of a typical balance embodying the present invention, it will be clear that the balance makes possible precision weighing operations without the necessity of handling weights manually or of keeping a record of, or mentally counting and totalling, the weights which are applied to the weight pan of the balance. Also, the balance can be operated with the casing completely closed after the material to be weighed has been placed on the scale pan. Moreover, inasmuch as all operations after selection of the weights are accomplished by means of the control knob 170, a marked improvement in the technique of weighing is obtained. Also, selection of the weights can be made much more quickly by manipulation of the weight-selecting knobs than is possible with manual selection, including opening and closing of the balance case.

It will be understood that the weight-selecting mechanism is susceptible to some modification, in the mounting or supporting structure therefor and in the positioning and construction of the knobs and indicating means and the balance beam and supports therefor. Therefore, the balance described above should be considered as illustrative and not as limiting the scope of the following claims.

I claim:

1. In a balance having a balance beam, scale pans supported on said beam and equilibrium indicating means associated with said beam; the combination of a plurality of weight-receiving hooks supported by said beam adjacent one end thereof, a plurality of vertically movable rods adjacent to said hooks, a support for a weight fixed to each rod and movable downwardly therewith to place the weight thereon on one of said hooks and upwardly therewith to remove the weight from the hook, a movable control member adjacent the lower ends of said rods, said control member having groups of apertures therein movable selectively into alignment with the lower ends of said rods to allow them to move downwardly to place weights on said hooks singly and in combinations, and means for lowering said rods relative to said control member to place weights on said hooks corresponding to the apertures in said control member and aligned with said rods and for lifting said rods to remove weights from said hooks.

2. In a balance having a balance beam, scale pans supported on said beam and equilibrium indicating means associated with said beam; the combination of a plurality of weight-receiving hooks supported by said beam adjacent one end thereof, a plurality of vertically movable rods adjacent to said hooks, a support for a weight fixed to each rod and movable downwardly therewith to place the weight thereon on one of said hooks and upwardly therewith to remove the weight from the hook, a movable control member adjacent the lower ends of said rods, said control member having groups of apertures therein movable selectively into alignment with the lower ends of said rods to allow them to move downwardly to place weights on said hooks singly and in combinations, means for lowering and lifting said rods to place weights on and remove weights from said hooks, respectively, and an adjusting member having an indicator thereon connected to said control member to move said control member and indicate the value of the weight or combination of weights placed on said hooks.

3. In a balance having a balance beam, scale pans supported on said beam and equilibrium indicating means associated with said beam; the combination of a plurality of weight-supporting hooks mounted on one of said scale pans, a plurality of vertically extending members adjacent to said hooks, means to guide said members for vertical movement relative to each other, a support for a weight fixed to and movable with each member, each support being adjacent to a different hook and movable downwardly with its corresponding member to place the weight thereon on the adjacent hook and upwardly to remove the weight from the hook, a control member adjacent to the lower ends of a group of said vertically extending members, said control member having a plurality of groups of apertures therein movable selectively into positions relative to said vertically extending members to permit their downward movement to place a weight or weights on said hooks, said control member also having an imperforate portion movable to a position to retain said vertically extending members against downward movement sufficient to place a weight on a hook, means for moving said control member to position it relative to said vertically extending member, and means to raise and lower said vertically extending members relative to said control member.

4. In a balance having a balance beam, scale pans supported on said beam and equilibrium indicating means associated with said beam; the combination of a plurality of weight-supporting hooks mounted on one of said scale pans, a plurality of vertically movable rods adjacent to said hooks, said rods being movable relative to each other, a support for a weight fixed to and movable with each movable rod, each support being adjacent to a different hook and movable downwardly by gravity with its corresponding movable rod to place the weight thereon on the adjacent hook and upwardly to remove the weight from the hook, a control member adjacent to the lower ends of a group of said movable rods, said control member having a plurality of groups of apertures therein movable selectively into alignment with said movable rods to permit downward movement of said movable rods to place a weight or weights on said hooks, said control member being movable also to a position to retain said movable rods against downward movement sufficient to place a weight on a hook, means for lifting all of said movable rods upwardly to lift weights from said hooks, said means being movable downwardly to lower all of said movable rods, and means for moving said control member to position its apertures relative to said movable rods.

5. In a balance having a balance beam and a scale pan supported by one end of said beam; the combination of a plurality of weight-receiving elements supported by the other end of the beam, a weight-supporting member adjacent each weight-receiving element and movable relative thereto to place a weight on and remove it from a weight-receiving element, a control member having a series of apertures therein arranged in groups, axially movable plungers interposed between said control member and said weight-supporting members, said plungers being receivable in apertures in said control member to move said weight-supporting members and place weights on said weight-receiving elements individually and in combinations, means to move said control member to bring different individual apertures and combinations of apertures selectively into alignment with said plungers, means to move said plungers out of said apertures and simultaneously move said weight-supporting members to remove weights from said weight-receiving elements, and an indicator connected to said control member to indicate directly the total value of the weight placed on said weight-receiving elements.

6. The balance set forth in claim 5 in which said control member is a drum having said apertures positioned individually and in combinations in angularly spaced relation around the circumference of said drum, and said indicator comprises a knob having indicia around its edge corresponding to the value of the weights represented by the apertures in the drum, said knob being connected to said drum to rotate it to position selected apertures in alignment with selected plungers.

7. In a balance having a balance beam, a scale pan supported by said beam and means including a movable control knob for releasing said beam and said scale pan for swinging movement and for retaining them against swinging movement; the combination of a plurality of weight-receiving hooks supported by said balance beam in opposition to said scale pan, a weight-supporting member adjacent each hook and movable relative thereto to place a weight on and remove it from a hook, a plunger corresponding to each weight-supporting member for moving it to place a weight on its corresponding hook upon downward movement of said plunger, and remove the weight from said hook upon upward movement of said plunger, means connecting said control knob to said plungers for moving them downward prior to release of said balance beam and scale pan and for moving them upward in response to movement of said control knob, a movable control member adjacent to a plurality of said plungers having a surface engageable by said plungers to prevent substantial downward movement thereof, said control member having openings in said surface to receive selectively said plungers individually and in groups to permit downward movement thereof sufficient to place corresponding weights on said hooks, a knob to adjust said control member relative to said plungers, said knob having indicia thereon indicating directly the value of the weight corresponding to the position of said control member.

8. The balance set forth in claim 7 in which said control member is a rotatably mounted drum and the knob is connected to said drum for rotating it.

9. The balance set forth in claim 7 comprising releasable locking means for said control member to lock the latter against movement, and means connecting said locking means to said control knob to lock said control member when said beam is released, and to release said control member when said beam is retained against swinging movement.

10. The balance set forth in claim 7 comprising a plurality of control members each corresponding to a different group of plungers, each control member having a separate knob to adjust it relative to its corresponding group of plungers, each knob having indicia thereon to indicate the total value of the weights placed on the hooks by the weight-supporting members moved by the corresponding plungers.

11. In a balance having a balance beam and a scale pan supported by said beam; the combination of weight receiving means supported by said beam, a plurality of movable weight-supporting elements adjacent to said weight-receiving means, said weight-supporting elements being movable to place weights on and remove them from said weight-receiving means, a control drum mounted below said weight-receiving means for rotation about a substantially horizontal axis, said drum having apertures therein corresponding to the weight-supporting elements positioned individually and in combinations in angularly spaced relation around the circumference of said drum, lifting means for moving said weight-supporting elements interposed between said weight-supporting means and said drum, said lifting means including plungers movable into apertures in said drum aligned therewith to move said weight-supporting means to place weights on said weight-receiving means corresponding to said apertures and combinations thereof, and movable out of said apertures to move said weight-supporting means to remove weights from said weight-receiving means, means to move said lifting means relative to said drum to allow said plungers to move into apertures aligned therewith, and to move said plungers out of said apertures, and means to rotate said drum to position selected apertures and combinations of apertures in position to receive said plungers.

12. A balance having a platform, a standard extending upwardly from the platform, a balance beam on the standard and a scale pan supported by said beam; and the combination of weight-receiving means supported by said beam, a plurality of movable weight-supporting elements adjacent to said weight-receiving means, said weight-supporting elements being movable to place weights on and remove them from said weight-receiving means, a control member movably mounted below said platform, said control member having apertures therein corresponding to the weight-supporting elements and positioned individually and in combinations in spaced relation in the control member, lifting means to move said weight-supporting elements interposed between said weight-supporting means and said control member, said lifting means including plungers movable into apertures in said control member aligned therewith to move said weight-supporting means to place weights on said weight-receiving means corresponding to said apertures and combinaitons thereof, and movable out of said apertures to move said weight-supporting means to remove weights from said weight-receiving means, means to move said lifting means relative to said control member to allow said plungers to move into apertures aligned therewith, and to move said plungers out of said apertures, and means to move said control member to position selected apertures and combinations of apertures in position to receive said plungers.

BERNARD WASKO.

References Cited in the file of this patent
UNITED STATES PATENTS

| Number | Name | Date |
|---|---|---|
| 1,345,180 | Heusser | June 29, 1920 |
| 1,521,923 | Ainsworth | Jan. 6, 1925 |
| 2,102,938 | Becker | Dec. 21, 1937 |
| 2,192,905 | Gattoni | Mar. 12, 1940 |